US005214443A

United States Patent [19]

Ryu

[11] Patent Number: 5,214,443

[45] Date of Patent: May 25, 1993

[54] DISCHARGING APPARATUS FOR AUTOMATICALLY DISCHARGING A PAPER BOX OF A COLOR VIDEO PRINTER

[75] Inventor: Ji S. Ryu, Seoul, Rep. of Korea

[73] Assignee: Goldstar Co., Ltd., Rep. of Korea

[21] Appl. No.: 802,060

[22] Filed: Dec. 3, 1991

[30] Foreign Application Priority Data

Dec. 4, 1990 [KR] Rep. of Korea ............... 19062/1990

[51] Int. Cl.[5] ........................ G01D 15/24; B41J 29/00

[52] U.S. Cl. ...................................... 346/22; 346/134; 271/176

[58] Field of Search ...................... 346/22, 134; 271/3, 271/176, 902, 258; 414/13-21, 222

[56] References Cited

FOREIGN PATENT DOCUMENTS 0215433 9/1987 Japan .................................. 271/176

*Primary Examiner*—Benjamin R. Fuller
*Assistant Examiner*—Alrick Bobb
*Attorney, Agent, or Firm*—Blakely, Sokoloff, Taylor & Zafman

[57] ABSTRACT

An apparatus for automatically discharging a paper box of a color video printer comprising paper box discharging lever for pushing the paper box toward a predetermined discharging position, the lever rotatably mounted on a main frame of the printer, a sliding lever for causing discharging lever to rotate, the sliding lever movably mounted on the main frame so as to be rectilinearly reciprocated, a sensing member for determining whether the printed paper is received by the paper box, a driving member for selectively driving the sliding lever in accordance with a control signal applied from the sensing member thereto, and an elastic support member for elastically supporting the sliding lever. The paper box discharging apparatus of this invention provides advantage in that it provides the facility in maniuplation of the color video printer and improving the reliability of the printer.

6 Claims, 2 Drawing Sheets

DISCHARGING APPARATUS FOR AUTOMATICALLY DISCHARGING A PAPER BOX OF A COLOR VIDEO PRINTER

BACKGROUND OF THE INVENTION

1. Field of The Invention

The present invention relates to a color video printer, and more particularly to a discharging apparatus for automatically discharging a printing paper box of such a color video printer in which the printing paper box is automatically discharged by means of an interlocking mechanism comprising a cam and levers as the paper box receives the printing papers.

2. Description of The Prior Art

Conventionally, a known color video printer is provided therein with a paper discharging device comprising a paper discharging box for receiving and discharging a printed paper. Upon accomplishing a printing operation of the printer, the printed paper is automatically transmitted to the paper discharging box by means of a paper discharging roller. Then, a discharging lever is manually pulled in order to allow the printed paper in the paper discharging box to be discharged from the printer so that the discharged paper can be obtained by the user. Thereafter, upon releasing the pulling force for the discharging lever, the discharging lever returns to the original position thereof by virtue of a restoring force of a spring which always biases the discharging lever.

However, the known device for manually discharging the printed paper has a disadvantage in that it has to be manually manipulated in order to discharge the printed papers, thereby being concomitant with a troublesomeness in discharging the printed papers.

SUMMARY OF THE INVENTION

It is, therefore, an object of the present invention to provide a discharging apparatus for automatically discharging a printing paper box of a color video printer in which the above-mentioned disadvantage can be overcome, and in which upon receiving the printed paper, the paper box is automatically discharged by virtue of a driving mechanism which is actuated in accordance with a control signal of a sensing member which senses the reception of the printed paper by the paper box.

The above-mentioned object of this invention can be accomplished by providing an apparatus for automatically discharging a paper box of a color video printer comprising: a pushing member for pushing the paper box toward a predetermined discharging position, the pushing member rotatably mounted on a main frame of the printer; a sliding member for causing the pushing member to rotate, the sliding member movably mounted on the main frame so as to be rectilinearly reciprocated; a sensing member for determining whether the printed paper is received by the paper box; a driving member for selectively driving the sliding member in accordance with a control signal applied from the sensing member thereto; and an elastic support member for elastically supporting the sliding member.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
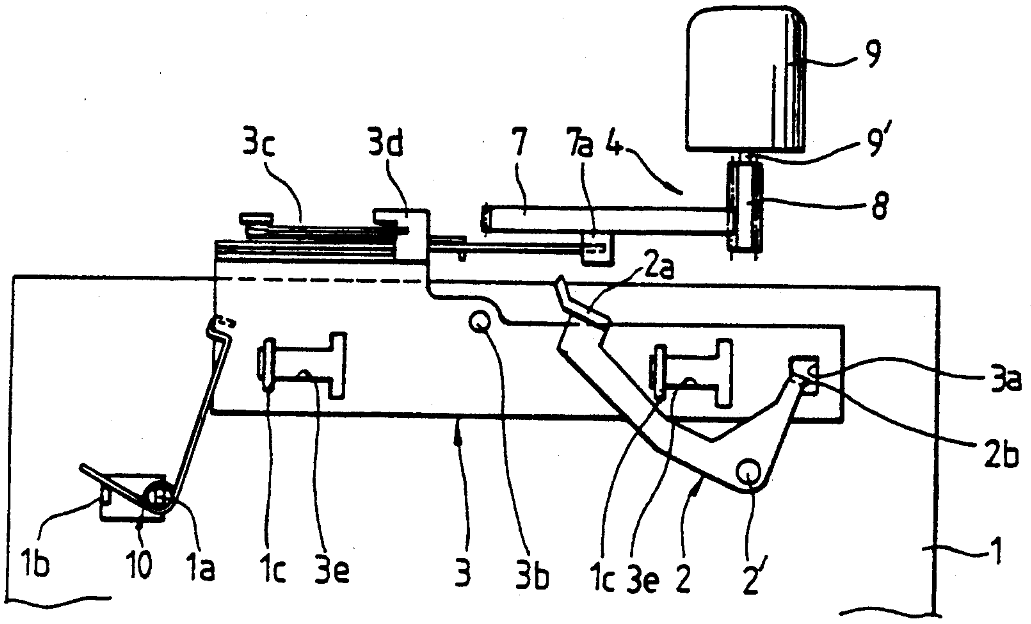
FIG. 1 is a schematic plane view showing a construction of a paper box discharging apparatus of color video printer in accordance with this invention.

Referring now the FIGS. 1 to 4 which show a paper box discharging apparatus of a color video printer according to this invention, the apparatus is provided with a paper box discharging lever 2 which is mounted on a main frame 1 by means of a pin 21 in order to rotate about the pin 21, and a slide lever 3 which is movably mounted on the frame 1 so as to be rectilinearly reciprocated on the main frame 1 in a predetermined distance and cause the lever 2 to rotate about the pin 21. In addition, a sensing member 12 is provided for the apparatus in order to determine whether a printed paper is received by a paper box 13 (see FIG. 3).

The apparatus is also provided with a driving member 4 for selectively driving the slide lever 3 in order to be rectilinearly reciprocated, upon receiving a control signal representing the paper reception from the sensing member 12, and an elastic biasing member such as a torsion spring 10 for biasing the slide lever 3 in order to automatically return the lever 3 to the original position by means of a restoring force thereof. Here, the discharging lever 2 automatically rotates by means of the rectilinearly reciprocating motion of the slide lever 3, thereby discharging the paper box.

In addition, the slide lever 3 is provided with a pair of T-shaped guide grooves **3*e*, each formed at front or rear portion of the lever 3, for receiving a pair of guide pins 1*c* of the main frame 1, thereby efficiently guiding the rectilinear reciprocating motion of the slide lever 3. Also, a folded flap 3*c* is provided for the slide lever 3 as vertically and upwardly extending from a rear side portion of the slide lever 3. The folded flap 3*c* has a stopper 3*d*** formed as rearwardly extending from an upper end thereof.

As shown in the drawings, a forward driving member comprises a driving motor 9 separately disposed from a rear end of the main frame 1, a worm gear 8 mounted on a driving shaft 9' of the motor 9, a cam gear 7 which is provided with an actuating pin **7*a* forwardly extending from a peripheral surface thereof and engages with the worm gear 8, an intermediate lever 5 which contacts at a contact end 5*a* thereof with the actuating pin 7*a* of the cam gear 7 and is rotatably supported at the other end thereof to the folded flap 3*c* of the slide lever 3 by means of a pin 5*b*. In addition, the forward driving member includes an elastic spring member such as a torsion spring 6 which is inserted onto the pin 5', elastically supported at an end thereof by the stopper 3*d* of the folded flap 3*c* and elastically supported at the other end thereof by a lower surface of the intermediate lever 5**.

Thus, the intermediate lever 5 is elastically supported by the torsion spring 6 in order to elastically contact with the actuating pin **7*a* of the cam gear 7**.

On the other hand, the discharging lever 2 has a protrusion **2*a* at an end thereof for pushing the paper box 13, and a connecting pin 2***b* at the other end thereof. The connecting pin 2*b* of the lever 2 is connected to the slide lever 3 as being inserted into a hole 3*a* formed on the slide lever 3.

Figure 3:
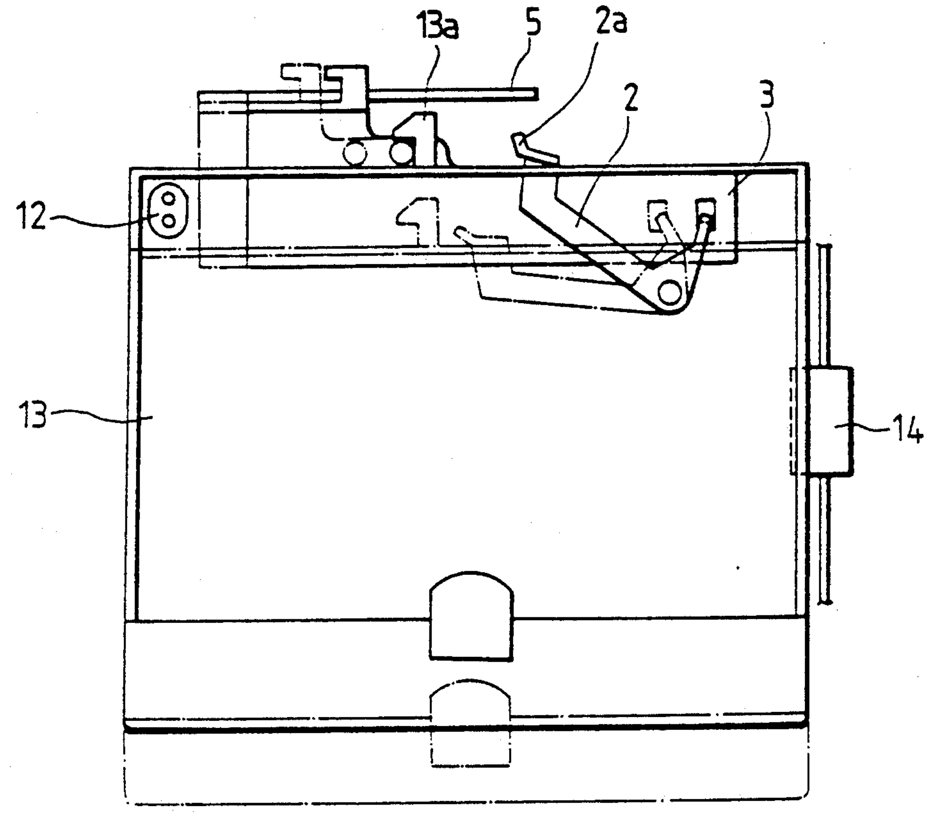
FIG. 3 is a schematic plane view showing a paper box discharging operation of the apparatus of FIG. 1.
Figure 4:
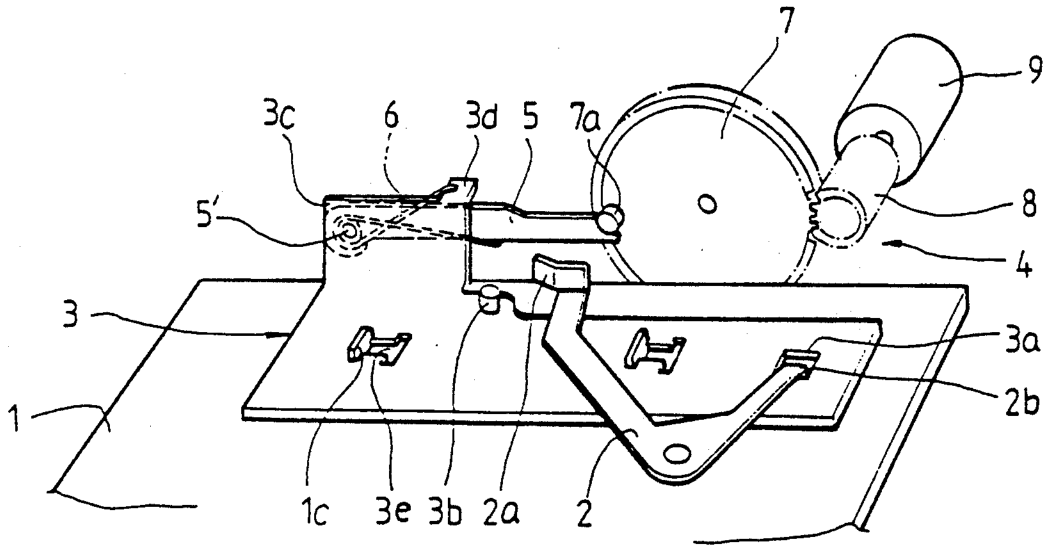
FIG. 4 is a schematic perspective view of the apparatus of FIG. 1.

As shown in FIGS. 3 and 4, the slide lever 3 is provided with a vertical locking pin 3*b* for selectively locking a hook 13*a* of the paper box 13, the locking pin 3*b* formed as upwardly extending from an upper surface of a rear portion of the slide lever 3 near the folded flap 3*c*.

As described above, the elastic biasing member for biasing the slide lever 3 comprises the torsion spring 10 of which a coiled portion is inserted onto a support pin 1*a* of the main frame 1, an end is elastically supported by a stopper 1*b* of the frame 1 and the other end is elastically supported by an end of the slide lever 3, thereby always biasing the slide lever 3.

In the drawings, the reference numeral 14 denotes a paper transmitting roller for guiding the printed paper (not shown) into the paper box 13.

The operation of the paper box discharging apparatus having the above construction will be dewscribed hereinafter.

Figure 2:
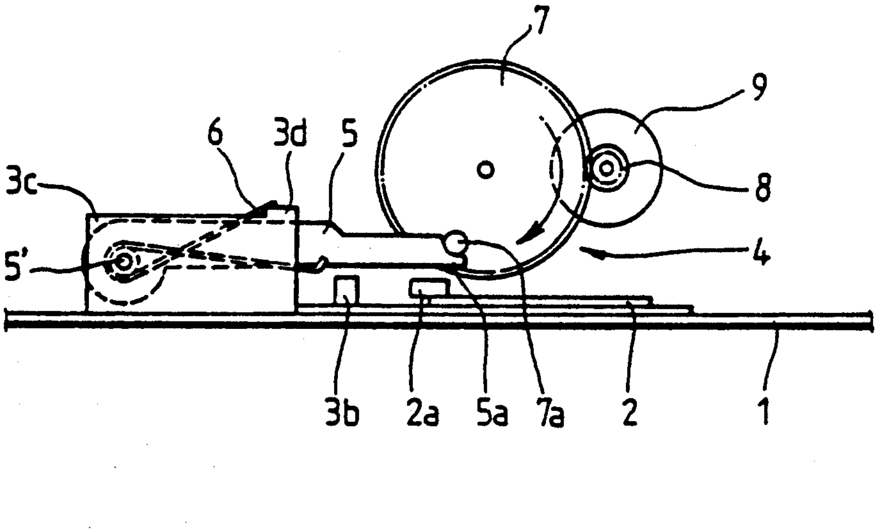
FIG. 2 is a schematic front view of the paper box discharging apparatus of FIG. 1.

Upon accomplishing a printing operation of the printer, the paper transmitting roller 14 transmits a printed paper to the paper box 13. Then, the sensing member 12 senses the reception of the printed paper by the paper box 13, then outputs a control signal representing the reception of the paper to the driving motor 9. Upon receiving the control signal from the sensing member 12, the motor 9 drives the worm gear 8 and the cam gear 7 which engage with each other. In result, the cam gear 7 clockwise rotates as shown at the arrow of FIG. 2, thus the actuating pin 7*a* pushes the intermediate lever 5 in leftward direction, thereby causing the intermediate lever 5 to move from an original position shown in the solid line of FIG. 3 to a biased position shown in the phantom line. In accordance, the slide lever 3 moves leftward. Upon such a displacement of the slide lever 3, the locking pin 3*b* of the slide lever 3 also moves leftward so that it is free from the locking state with the hook 13*a* of the paper box 13. At the same time, the discharging lever 2 elastically rotates in counterclockwise direction so that the protrusion 2*a* thereof pushes the paper box 13 forwardly, that is, pushes the paper box 13 from a solid line position of FIG. 3 to a phantom line position. At this time, the moving distance of the paper box 13 due to the pushing force of the discharging lever 2 will be determined by virtue of a stroke of the discharging lever 2.

As the paper box 13 reaches a predetermined discharging position, the motor 9 rotates in an opposite direction in order to drive the cam gear 7 to return to the original position thereof. At this time, the discharging lever 2 and the slide lever 3 return to their original positions by virtue of the restoring force of the torsion spring 10, respectively.

Upon taking out the printed paper, the user pushes the paper box 13 rearwards in order to cause the hook 13*a* of the box 13 to engage with the locking pin 3*b* of the slide lever 3, thereby accomplishing a paper receiving state of the box 13.

As described above, the present invention provides a paper box discharging apparatus for color video printer which includes an interlocking mechanism comprising a plurality of actuating levers, such as a discharging lever, a slide lever and a intermediate lever, and a cam gear, thereby automatically discharging the paper box to a position in which the printed paper is easily taken out. Thus, the paper box discharging apparatus of this invention provides advantage in that it provides the facility in manipulation of the color video printer and improving the reliability of the printer.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. An apparatus for automatically discharging a paper box of a color video printer, comprising:

pushing means for pushing said paper box toward a predetermined discharging position, said means being rotatably mounted on a main frame of said printer;

sliding means for causing said pushing means to rotate, said sliding means being movably mounted on said main frame so as to be rectilinearly reciprocated;

sensing means for determining whether the printed paper is received by the paper box;

driving means for selectively driving said sliding means in accordance with a control signal applied from said sensing means thereto; and elastic support means for elastically supporting the sliding means.

2. An apparatus as claimed in claim 1, wherein said pushing means includes a pushing member at an end thereof for pushing the paper box, and a connecting member at another end thereof for being connected to said sliding means in order to receive a driving force from the sliding means.

3. An apparatus as claimed in claim 1 or 2, wherein said sliding means includes a hole for connecting the sliding means to said connecting member of pushing means, and a locking member for selectively locking a hook of the paper box.

4. An apparatus as claimed in claim 1, wherein said driving means comprises a driving motor provided with a worm gear connected to a driving shaft thereof, a cam gear engaging with said worm gear, an intermediate lever which is driven by said cam gear in order to cause said sliding means to be rectilinearly reciprocated, and an elastic support member for elastically supporting said intermediate lever.

5. An apparatus as claimed in claim 1, wherein said elastic support means comprises a torsion spring of which a coiled portion is inserted onto a support pin of said main frame, an end is elastically supported by a stopper of the main frame, and another end is elastically supported by an end of said sliding means.

6. An apparatus as claimed in claim 1, wherein said sliding means includes a pair of guide grooves, each formed at front and rear portion of said sliding means, for receiving a pair of guide pins of the main frame, thereby efficiently guiding the rectilinear reciprocating motion of the sliding means.

* * * * *